(12) United States Patent
Nam

(10) Patent No.: US 11,820,001 B2
(45) Date of Patent: Nov. 21, 2023

(54) AUTONOMOUS WORKING SYSTEM, METHOD AND COMPUTER READABLE RECORDING MEDIUM

(71) Applicant: LANDOR ARCHITECTURE, INC., Seoul (KR)

(72) Inventor: Han Seok Nam, Seoul (KR)

(73) Assignee: LANDOR ARCHITECTURE, INC., Seoul (KR)

( * ) Notice: Subject to any disclaimer, the term of this patent is extended or adjusted under 35 U.S.C. 154(b) by 482 days.

(21) Appl. No.: 17/069,242

(22) Filed: Oct. 13, 2020

(65) Prior Publication Data
US 2021/0039265 A1    Feb. 11, 2021

Related U.S. Application Data

(63) Continuation of application No. PCT/KR2019/004431, filed on Apr. 12, 2019.

(30) Foreign Application Priority Data

Apr. 13, 2018 (KR) .......................... 10-2018-0043570

(51) Int. Cl.
*B25J 13/08* (2006.01)
*B25J 3/00* (2006.01)
*B25J 9/16* (2006.01)

(52) U.S. Cl.
CPC .............. *B25J 13/088* (2013.01); *B25J 3/00* (2013.01); *B25J 9/161* (2013.01); *B25J 9/1664* (2013.01)

(58) Field of Classification Search
CPC ... B25J 13/088; B25J 3/00; B25J 9/161; B25J 9/1664
See application file for complete search history.

(56) References Cited

U.S. PATENT DOCUMENTS 9,026,248 B1* 5/2015 Hickman ............. G05B 19/418
  700/248
2018/0242806 A1* 8/2018 Haegermarck ........ G05D 1/024
(Continued)

FOREIGN PATENT DOCUMENTS

JP        2013-109325 A    6/2013
KR   10-2010-0086093 A    7/2010
(Continued)

OTHER PUBLICATIONS

International Search Report for PCT/KR2019/004431 dated Jul. 18, 2019 [PCT/ISA/210].
(Continued)

*Primary Examiner* — Kira Nguyen
(74) *Attorney, Agent, or Firm* — Sughrue Mion, PLLC

(57) ABSTRACT

An autonomous working system, an autonomous working method, and a computer readable recording medium are provided. The autonomous working system includes a master working robot and at least one slave working robot, in which the master working robot including a data receiving unit to receive information on space targeted for working, a sensing unit to sense the space targeted for working, a sensing setting unit to set a movement path of the master working robot, a sensing position, and a sensing angle of the sensing unit, and a first position determination unit to determine a position of the master working robot by comparing sensing data obtained through the sensing unit at the sensing position with reference map data, and the at least one slave working robot includes a second position determination unit that determines the position of the at least one slave working robot.

13 Claims, 15 Drawing Sheets

(56) References Cited

U.S. PATENT DOCUMENTS

2019/0217474 A1* 7/2019 Tang .................... A47L 9/2852
2019/0310656 A1* 10/2019 Suzuki .................... G06N 7/00

FOREIGN PATENT DOCUMENTS

| KR | 10-2014-0045848 A | 4/2014 |
| KR | 10-2015-0000315 A | 1/2015 |
| KR | 10-2016-0136505 A | 11/2016 |

OTHER PUBLICATIONS

Written Opinion for PCT/KR2019/004431 dated Jul. 18, 2019 [PCT/ISA/237].

* cited by examiner

AUTONOMOUS WORKING SYSTEM, METHOD AND COMPUTER READABLE RECORDING MEDIUM

TECHNICAL FIELD

The present disclosure relates to an autonomous working system, an autonomous working method, and a computer readable recording medium, and more specifically, to an autonomous working system, an autonomous working method, and a computer readable recording medium, using a plurality of working robots including a position determining function.

BACKGROUND ART

With the development of technology, the area in which machines take over the role of humans is gradually increasing. For example, there are programs with human learning capabilities, or autonomous vehicles that limit human intervention to a minimum.

Machines or robots that perform various tasks in the task field by identifying their own positions are increasing in actual application. In order for machines to identify their own positions in space by themselves, expensive equipment with high complexity is required.

Meanwhile, to quickly perform various tasks in the field, more equipment is used. Accordingly, more use of expensive equipment brings about an increase in costs.

Therefore, there is a need for methods that can secure the accuracy of task execution while using a simple system as possible.

DESCRIPTION OF EMBODIMENTS

Technical Problem

The objectives of the present disclosure are to provide an autonomous working system, an autonomous working method, and a computer readable recording medium, in which tasks are performed using a plurality of task equipment, and high accuracy and efficiency are obtained through simple configuration.

Solution to Problem

In an autonomous working system including a master working robot and at least one slave working robot, according to an embodiment of the present disclosure, the master working robot includes: a data receiving unit to receive information on space targeted for working; a sensing unit to sense the space targeted for working; a sensing setting unit to set a movement path of the master working robot, a sensing position, and a sensing angle of the sensing unit; and a first position determination unit to determine a position of the master working robot by comparing sensing data obtained through the sensing unit at the sensing position with reference map data, and the slave working robot includes a second position determination unit that determines the position of the slave working robot.

In an embodiment, the second position determination unit may receive the information on the position of the master working robot, and determine the position of the slave working robot in consideration of the received position and the distance and angle between the slave working robot and the master working robot.

In an embodiment, the slave working robot may further include a distance measuring unit to measure and/or calculate a distance to the master working robot and a distance to a specific point of the space targeted for working.

In an embodiment, the autonomous working system may further include a position information management unit to receive information on the position of the master working robot from the first position determination unit, wherein the second position determination unit receives the information on the position of the master working robot from the position information management unit.

In an embodiment, the second position determination unit may receive a position signal output from a transceiver provided at an arbitrary position, and determine the position of the slave working robot from the position signal.

In an embodiment, the master working robot may further include an information display unit to display task information on the space targeted for working, and the slave working robot may further include a working unit to recognize the task information and perform a task corresponding to the recognition result.

In an embodiment, the task information may further include position information corresponding to a position at which the task information is displayed, and the second position determination unit determines a position of the slave working robot by using the position information.

In an embodiment, a position, at which the task information is displayed, may exist on the movement path of the master working robot.

In an embodiment, the sensing setting unit may set the sensing position for sensing the space targeted for working in consideration of reference map data corresponding to the space targeted for working.

In an embodiment, the master working robot may further include a map generating unit to generate the reference map from sensing data obtained through the sensing unit at an arbitrary reference position.

An autonomous working method using an autonomous working system including a master working robot and at least one slave working robot, according to an embodiment of the present disclosure, includes: receiving information regarding space targeted for working; setting a movement path of the master working robot, a sensing position, and a sensing angle at the sensing position; determining a position of the master working robot by comparing sensing data obtained at the sensing position with reference map data, and determining a position of the slave working robot.

In an embodiment, the determining a position of the slave working robot may include: receiving information on the position of the master working robot; and measuring and/or calculating a distance and angle between the slave working robot and the master working robot.

In an embodiment, in the determining the position of the slave working robot, a position signal output from a transceiver provided at an arbitrary position is received, and the position of the slave working robot is determined from the position signal.

In an embodiment, the autonomous working method may further include: displaying, by the master working robot, task information on the space targeted for working, and recognizing the task information and performing a task corresponding to the recognition result, by the slave working robot.

In an embodiment, the task information may further include position information corresponding to a position at which the task information is displayed, and, in the determining of the position of the slave working robot, the position of the slave working robot may be determined by using the position information.

Meanwhile, provided is a computer-readable recording medium having recorded thereon a program for performing the autonomous working method according to the present disclosure.

Advantageous Effects of Disclosure

The present disclosure provides an autonomous working system, an autonomous working method, and a computer readable recording medium, in which tasks are performed using a plurality of task equipment, and high accuracy and efficiency are obtained through simple configuration.

MODE OF DISCLOSURE

Figure 1:
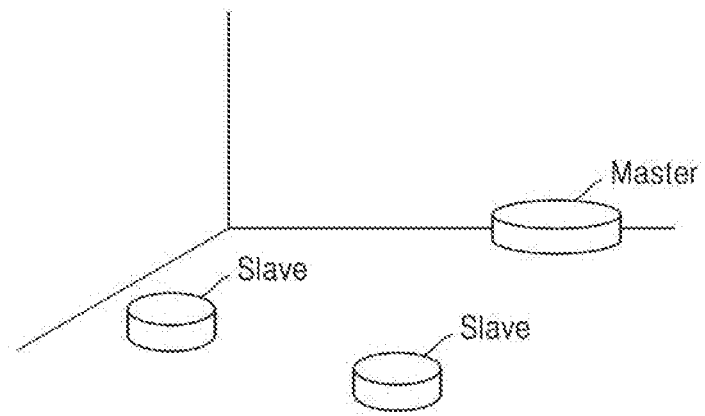
FIG. 1 illustrates an example of a working robot to which an autonomous working system is applied, according to the present disclosure.

Advantages and features of the present disclosure and methods of accomplishing the same may be understood more readily by reference to the following detailed description of embodiments and the accompanying drawings. However, the present disclosure may be embodied in many different forms and should not be construed as being limited to the embodiments set forth herein, and it is to be appreciated that all changes, equivalents, and substitutes that do not depart from the spirit and technical scope of the present disclosure are encompassed in the disclosure. The embodiments set forth herein are provided so that this disclosure may be thorough and complete and may fully convey the scope of the present disclosure to one of ordinary skill in the art. In the description of the disclosure, certain detailed explanations of the related art are omitted when it is deemed that they may unnecessarily obscure the essence of the present disclosure.

The terms used herein are merely used to describe particular embodiments and are not intended to limit the present disclosure. An expression used in the singular encompasses the expression of the plural, unless it has a clearly different meaning in the context. In the present specification, it is to be understood that the terms such as "include" and "comprise" are intended to indicate the existence of features, numbers, steps, actions, components, parts, or combinations thereof described in the specification and are not intended to preclude the possibility that one or more other features, numbers, steps, actions, components, parts, or combinations thereof may exist or may be added. Advantages and features of the present disclosure and methods of accomplishing the same may be understood more readily by reference to the following detailed description of embodiments and the accompanying drawings. However, the present disclosure may be embodied in many different forms and should not be construed as being limited to the embodiments set forth herein, and it is to be appreciated that all changes, equivalents, and substitutes that do not depart from the spirit and technical scope of the present disclosure are encompassed in the disclosure. The embodiments set forth herein are provided so that this disclosure may be thorough and complete and may fully convey the scope of the present disclosure to one of ordinary skill in the art. In the description of the disclosure, certain detailed explanations of the related art are omitted when it is deemed that they may unnecessarily obscure the essence of the disclosure.

The terms used herein are merely used to describe embodiments and are not intended to limit the disclosure. An expression used in the singular encompasses the expression of the plural, unless it has a clearly different meaning in the context. In the present specification, it is to be understood that the terms such as "include" and "comprise" are intended to indicate the existence of features, numbers, steps, actions, components, parts, or combinations thereof described in the specification and are not intended to preclude the possibility that one or more other features, numbers, steps, actions, components, parts, or combinations thereof may exist or may be added. While such terms as "first" and "second" may be used to describe various components, such components must not be limited to the above terms. The above terms are used only to distinguish one component from another.

FIG. 1 illustrates an example of a working robot to which an autonomous working system is applied, according to the present disclosure.

According to the present disclosure autonomous working system may perform various tasks in the workspace by using a plurality of working robots. Basically, the working robots may determine their positions in the workspace, and may perform tasks assigned thereto at the position where the working robots will perform their task.

Referring to FIG. 1, an autonomous working system according to the present disclosure may be implemented through a plurality of working robots. The working robots may include at least one master working robot Master and at least one slave working robot Slave. The master working robot may determine the position thereof in a space targeted for working, and may display information on a task to be performed by the slave working robot.

The slave working robot may determine the position thereof based on the position of the master working robot, and may recognize a task to be performed by analyzing the information displayed by the master working robot and perform the recognized task.

In the present specification, the term "working robot" is used, but the robot is used only for the description of the present disclosure and the scope of the present disclosure is not necessarily limited by the term "robot".

It may be understood that the master working robot and the slave working robot may move freely in the workspace, due to the including of a driving device that provides a driving force, and may move not only on the ground but also in the air and underwater.

Meanwhile, although one master working robot and two slave working robots are illustrated in FIG. 1, the present embodiment is an example for illustrative purpose only, and the scope of the present disclosure is not limited to the specific number.

Figure 2:
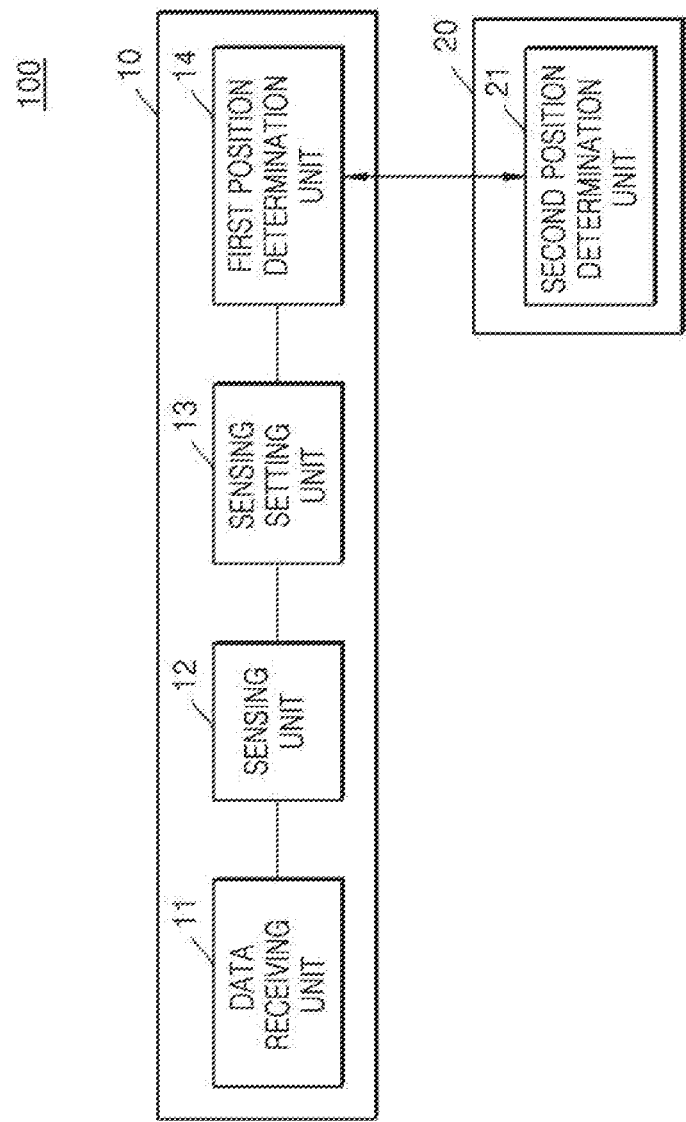
FIG. 2 schematically illustrates a configuration of an autonomous working system according to an embodiment of the present disclosure.

FIG. 2 schematically illustrates a configuration of an autonomous working system according to an embodiment of the present disclosure.

Referring to FIG. 2, an autonomous working system 100 according to an embodiment of the present disclosure includes at least one master working robot 10 and at least one slave working robot 20. Meanwhile, the master working robot 10 may include a data receiving unit 11, a sensing unit 12, a sensing setting unit 13, and a first position determination unit 14, and the slave working robot 20 may include a second position determination unit 21.

The data receiving unit 11 receives information on space targeted for working. The space targeted for working refers to a space in which the master working robot 10 and the slave working robot 20 perform tasks, and the information received by the data receiving unit 11 may include information on a drawing corresponding to the space targeted for working, and the location and size of walls, pillars, windows, etc. existing in the space targeted for working, for example, information on architectural and spatial elements of the space targeted for working. In addition, the data receiving unit 11 may receive information on a task that the master working robot 10 and the slave working robot 20 perform in the space targeted for working.

Meanwhile, the information on the space targeted for working may include information on the allowable movement ranges of the master working robot 10 and the slave working robot 20. For example, the space targeted for working may include a space in which walls, pillars, windows, etc. are to be provided, and there may be a space that the master working robot 10 and the slave working robot 20 are not allowed to enter before the providing of walls, pillars, windows, etc. In space where a wall has to be built or an elevator has to be installed, a floor surface may be discontinuous before a task is actually performed, and in some cases, the master working robot 10 and the slave working robot 20 may be in danger of falling. Accordingly, the information on the space targeted for working may include information on the allowable movements range to limit the movement ranges of the master working robot 10 and the slave working robot 20.

The data receiving unit 11 may be connected to the sensing unit 12 by wire or wirelessly, electrically or non-electrically to receive data obtained from the sensing unit 12. Optionally, the data receiving unit 110 may include a terminal, to which an external storage medium such as a universal serial bus (USB) port, a compact disc read-only memory (CD-ROM), etc. may be connected, and thus may receive data regarding the space targeted for working stored in the external storage medium. Optionally, the data receiving unit 11 may be electrically connected to a separate input unit (not shown) and thus may receive data regarding the space targeted for working input from the input unit. Optionally, the data receiving unit 11 may be electrically connected to a separate computing apparatus and thus may receive data regarding the space targeted for working from the computing apparatus.

The sensing unit 12 may sense the space targeted for working. The sensing unit 12 may include at least one sensor and a driving unit such as a motor that controls the rotational operation of the sensor, but is not limited thereto. When the sensing range of the sensor is 360 degrees, the driving unit such as the motor may not be included. Meanwhile, the master working robot 10 illustrated in FIG. 2 includes the data receiving unit 11, the sensing unit 12, the sensing setting unit 13, and the first position determination unit 14. However, in some embodiments, the sensing setting unit 13 and the first position determination unit 14 may exist independently at a position separated from the master working robot 10.

Meanwhile, as the sensor, various types of sensors capable of sensing the space targeted for working may be used. For example, the sensor may measure and/or calculate the distance to an object, sense the shape of an object, or sense the movement of the master working robot 10. Such a sensor may include a sensor using a laser or a sound wave, light wave and/or radio wave, an IMU sensor, a GPS sensor, and/or an image obtaining sensor capable of obtaining a moving image and/or a still image, such as a camera. When the sensor includes a laser sensor, a LiDAR sensor may be included as an example of the laser sensor.

The sensing unit 12 may include at least one sensor described above, and a sensing precision degree may be improved by combining different types of sensors. For example, the sensing precision degree with respect to the space targeted for working may be improved by sensing the movement of the master working robot 10 using a LiDAR sensor, as a laser sensor, and an IMU sensor. In addition, a camera sensor may be optionally and/or additionally included to allow the camera sensor to capture an image of the space targeted for working. For example, an image of a state and/or texture of a certain surface, particularly, a floor surface of the space targeted for working may be captured, and thus, a movement and/or work path of the master working robot 10 and/or the slave working robot 20 may be set and/or corrected. In addition, a distance measurement sensor may be optionally and/or additionally included, and thus, a distance to a specific point, for example, a wall or a pillar, may be calculated. Accordingly, it is possible to reflect the measured position of a specific point existing in the space targeted for working in setting and/or correcting the movement and/or work path of the master working robot 10 and/or the slave working robot 20. The various sensor combinations of the sensing unit 12 as described may not be provided only to master working robot 10. In some embodiments, some sensors of the sensing unit 12 may be provided to the slave working robot 20, and the corresponding data is provided to the master working robot 10 through communications. Accordingly, before and/or during working, the movement and/or work path of the master working robot 10 and/or the slave working robot 20 may be set and/or corrected. The configuration of the sensing unit 12 may be applied to all embodiments of the present specification.

The master working robot 10 may sense the surrounding space by using the sensor, and obtain the position of an object in the surrounding space in the form of polar coordinates by using information on signals output from the sensor and reflected. The motor allows the sensor to rotate by as much as a desired angle, for example, 360 degrees. A rotating direction of the sensor may be variously controlled according to the purpose.

Meanwhile, horizontal rotation, horizontal movement, tilt and/or vertical movement of the sensor may be controlled by a separate driving unit. Horizontal rotation, horizontal movement, tilt and/or vertical movement of the sensor may be controlled independently of one another, and control signals for controlling the horizontal rotation, horizontal movement, tilt and/or vertical movement may also be independently generated and be provided to the driving unit.

The sensing setting unit 13 may set a movement path of the master working robot 10, a sensing position, and a sensing angle of the sensing unit 12. The sensing setting unit 13 sets the movement path, and designates an arbitrary point on the movement path to set the designated point as a sensing position. In addition, if needed, according to the space targeted for working, there are a plurality of sensing positions. Correspondingly, when the master working robot 10 reaches the sensing position, the sensor performs a sensing operation, for example, a scanning operation. In this case, the sensor rotates according to the sensing angle set by the sensing setting unit 13.

Meanwhile, in another embodiment of the present disclosure, a sensing height of the sensor may be adjusted, and the sensing setting unit 13 may set a sensing angle and a sensing height of the sensor at a set sensing position. In addition, the sensing position and the sensing angle may be set in consideration of the characteristics of the space targeted for working.

In a case where it is difficult to obtain sensing data, for example, in a case of transmitting light without reflection, the sensing position and the sensing angle may be arranged in empty space of the space targeted for working so that a position and an angle where a pillar, an obstacle, or the like may be sensed, may be set as the sensing position and the sensing angle.

In the case where there is a drawing of the space targeted for working, the sensing setting unit 13 may set the movement path, the sensing position, and the sensing angle of the sensor at the sensing position by taking the drawing into account.

The master working robot 10 may be understood as performing a sensing operation at a specific position on the movement path. The specific sensing position is designated to accurately identify a position of the master working robot 10.

The specific position may be set as a limited number of positions, but is not limited thereto. In some embodiments, a sensing operation may be continuously performed while moving on the movement path.

Meanwhile, the sensing angle refers to the sensing angle of the sensor at each sensing position and may be expressed in degrees or radians. In addition, the size of the sensing angle may be expressed based on a specific coordinate axis, for example, an x-axis, or may be expressed based on an angle of the sensor at a point in time when a sensing operation in the very previous sensing position is ended.

The sensing setting unit may send an operation signal to a plurality of driving units of the master working robot 10 so as to set the movement path of the master working robot 10, a sensing position, and a sensing angle of the sensing unit 12.

In one embodiment of the present disclosure, the master working robot 10 stops at each of the sensing positions, and the sensor is rotated while the sensor is stopped at the sensing positions to sense, for example, scan the surrounding space. In another embodiment of the present disclosure, the master working robot 10 may not stop at the sensing position and may sense, for example, scan a surrounding space through the sensor during moving. The first position determination unit 14 determines the position of the master working robot 10 by comparing sensing data obtained through the sensing unit 12 at the a plurality of sensing positions with reference map data.

The reference map data may be represented as coordinates of pixels included in an image frame, and coordinates of a pixel corresponding to a position where an object exists may have a different value from coordinates of a pixel corresponding to an empty position. As described above, the data obtained through the sensor may be obtained in the form of polar coordinates, and when the reference map data and the sensing data are compared, the position of the master working robot 10 within the space targeted for working may be determined.

More specifically, the first position determination unit 14 may convert the reference map data into data in the form of polar coordinates obtained through the sensor, and compare the data obtained by the conversion with the sensing data.

In another embodiment, the first position determination unit 14 may receive a position signal output from a transceiver (not shown) provided at an arbitrary position, and determine the position of the master working robot from the position signal. When the position of the transceiver is determined, the transceiver may determine the position of the master working robot 10 based on its own position, and provide the determined position information to the first position determination unit 14. The transceiver is provided indoors and communicates with the master working robot to help determine the position of the master working robot 10. As another example, the transceiver may be provided to, for example, four corners of a building, and receive a GPS signal to recognize the coordinate value of the building, and then based on the coordinate value, new signals may be transmitted to help determining of the position of the master working robot 10.

In an embodiment, the first position determination unit 14 may determine the position of the master working robot 10 in consideration of the distance and angle data between the master working robot 10 and the transceiver, and information on the position of the transceiver. Optionally, the first position determination unit 14 may sense the position of a marker (not shown) provided at a certain position, and determine the position of the master working robot from the marker. For example, the first position determination unit 14 may determine the position of the master working robot 10 in reverse from a position where the position of the marker is sensed and/or the analysis of the sensing data.

The operation performed by the first position determination unit 14 aims to determine the position of the master working robot 10 as accurately as possible, and the transceiver and/or marker is attached to an arbitrary position of the space targeted for working, for example, a pillar or a wall, thereby transmitting the position signal and/or showing a position.

However, a position of the transceiver and/or the marker is not limited to an arbitrary position inside the space targeted for sensing. For example, when the space targeted for working is open space, a position of the master working robot 10 may be traced even when the transceiver and/or the marker is positioned outside the space targeted for working.

The master working robot 10 may include a receiver (not shown) capable of determining a position of the transceiver receiving the position signal and transmitting the received position signal and a distance and/or an angle with respect to the transceiver, and the receiver may determine a position of the master working robot 10 by taking into account a position signal received from at least one transceiver.

The transceiver may be configured through a signal sharer or a beacon and may be used when it is difficult to determine an accurate position of the master working robot 10 through comparison between the sensing data and the reference map data.

The marker may mark a certain color or shape or a predetermined number, and the master working robot 10 may determine a position of the master working robot 10 by including a recognizing member that is capable of recognizing the color, the shape, or the number. Meanwhile, the marker may be displayed to be identifiable through a special device such as an ultraviolet camera.

Meanwhile, the second position determination unit 21 of the slave working robot 20 determines the position of the slave working robot 20. The second position determination unit 21 may determine the position of the slave working robot 20 by using various methods, for example, such method as used by the first position determination unit 14 to determine the position of the master working robot 10. For example, the second position determination unit 21 may receive a position signal output from a transceiver provided at an arbitrary position, and may determine the position of the slave working robot 20 from the position signal. Optionally, the second position determination unit 21 may determine the position of the slave working robot 20 by sensing the position of the marker provided at an arbitrary position. The detailed method of determining the position of the slave working robot 20 by the second position determination unit 21 is the same as the detailed method of determining the position of the master working robot 10 by the first position determination unit 14, and thus a detailed description thereof will be omitted.

In one or more embodiments, the second position determination unit 21 may determine the position of the slave working robot 20 in consideration of the information on the position of the master working robot 10 and the relative position relationship between the slave working robot 20 and the master working robot 10.

For example, the second position determination unit 21 receives information on the position of the master working robot 10, and determines the position of the slave working robot 20 in consideration of the received position information and the distance and angle between the slave working robot 20 and the master working robot 10.

The master working robot 10 may determine its own position through the first position determination unit 14, and the information on the position of the master working robot 10 may be provided to the slave working robot 20. At this time, when relative position information, such as angle information, between the master working robot 10 and the slave working robot 20 is obtained, the position of the slave working robot 20 may be determined using the information on the position of the master working robot 10.

Meanwhile, the second position determination unit 21 may receive the information on the position of the master working robot 10 from the first position determination unit 14 in real time. Since the master working robot 10 and the slave working robot 20 may continuously move in the space targeted for working, when the information on the position of the master working robot 10 is provided in real time, the position of the slave working robot 20 may be more accurately determined.

With reference to the accompanying drawings, an example of a method in which the second position determination unit 21 determines the position of the slave working robot 20 will be described in more detail.

Figure 3:
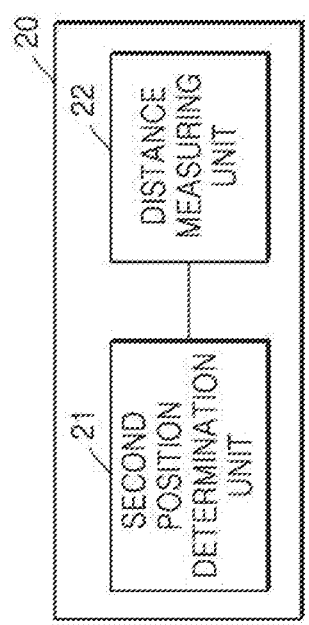
FIG. 3 schematically illustrates a configuration of a slave working robot according to an embodiment of the present disclosure.

FIG. 3 schematically illustrates a configuration of a slave working robot according to an embodiment of the present disclosure.

Referring to FIG. 3, according to another embodiment of the present disclosure, the slave working robot 20 includes the second position determination unit 21 and a distance measuring unit 22. The second position determination unit 21 determines the position of the slave working robot 20 by using distance information measured by the distance measuring unit 22.

For example, the distance measuring unit 22 may measure the distance from the slave working robot 20 to the master working robot 10 or a distance to a specific point of the space targeted for working. In addition, the distance measuring unit 22 may further measure an angle between the slave working robot 20 and the master working robot 10.

The distance measuring unit 22 may use a laser method or a GPS method to measure a distance, for example, any method that a person skilled in the art may use.

In order to measure the angle between the slave working robot 20 and the master working robot 10, after an arbitrary reference point is set and the angle between the reference point and the direction in which the distance measuring unit 22 is oriented is defined as 0°, the angle when the distance measuring unit 22 is oriented to the specific position of the master working robot 10, may be measured. Therefore, the specific position may be set to a position corresponding to the sensor included in the master working robot 10.

In one or more embodiments, the angle may be measured by using the distance between each of the master working robot 10 and the slave working robot 20 and the wall of the space targeted for working, and the distance between the master working robot 10 and the slave working robot 20.

Meanwhile, the time at which the distance measuring unit 22 measures the distance to the master working robot 10 and the time at which the information on the position of the master working robot 10 is provided from the first position determination unit 14 may synchronized with each other. That is, the information on the position of the master working robot 10 and the distance from the slave working robot 20 to the master working robot 10 are obtained at the same time, so that the second position determination unit 21 may accurately obtain the position of the slave working robot 20.

Figure 4:
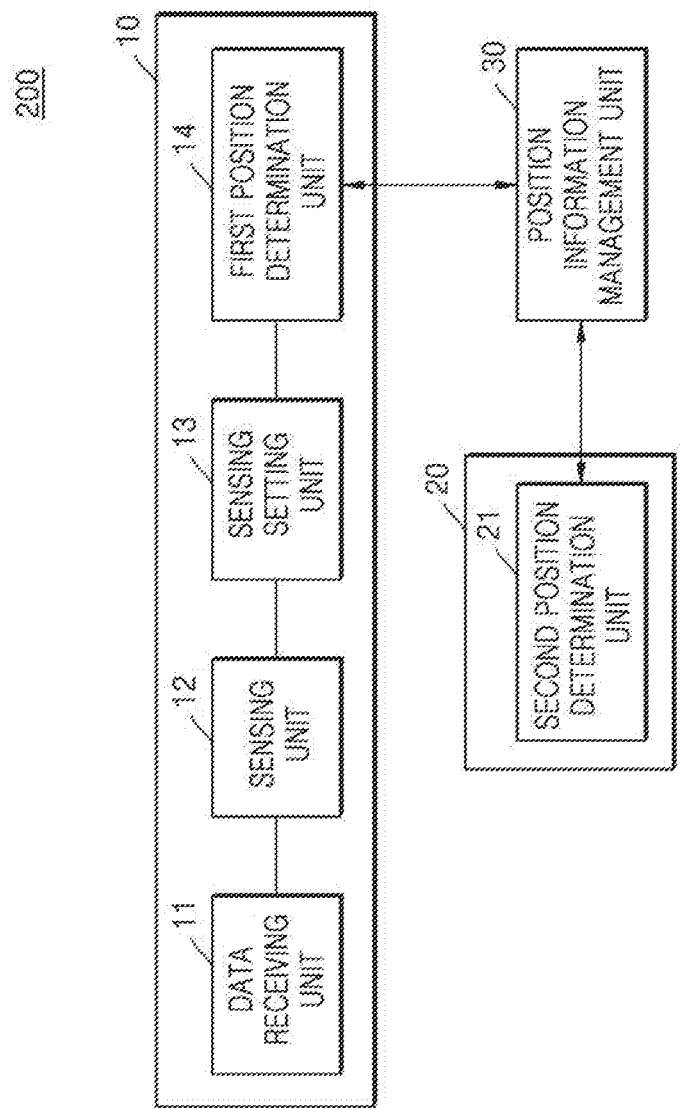
FIG. 4 schematically illustrates a configuration of an autonomous working system according to an embodiment of the present disclosure.

FIG. 4 schematically illustrates a configuration of an autonomous working system according to an embodiment of the present disclosure.

Referring to FIG. 4, an autonomous working system 200 according to another embodiment of the present disclosure includes the master working robot 10, the slave working robot 20, and a position information management unit 30. Since the master working robot 10 and the slave working robot 20 have substantially the same configuration as the master working robot 10 and the slave working robot 20 described with reference to FIG. 2, detailed descriptions of redundant content will be omitted.

The position information management unit 30 receives information on the position of the master working robot 10 from the first position determination unit 14, and the second position determination unit 21 receives the information on the position of the master working robot 10 from the position information management unit 30.

As described with reference to the preceding drawings, the second position determination unit 21 may determine the position of the slave working robot 20 by referring to the information on the position of the master working robot 10, and the position information management unit 30 may help the second position determination unit 21 determine the position of the slave working robot 20 by providing the information on the position of the master working robot 10 received from the first position determination unit 14 to the second position determination unit 21.

The communication between the position information management unit 30 and each of the first position determination unit 14 and the second position determination unit 21 may be embodied by any communication method such as wired communication or wireless communication, and the information on the position of the master working robot 10 may be provided to the second position determination unit 21 in real time to make the second position determination unit 21 to accurately determine the current position of the slave working robot 20.

Figure 5:
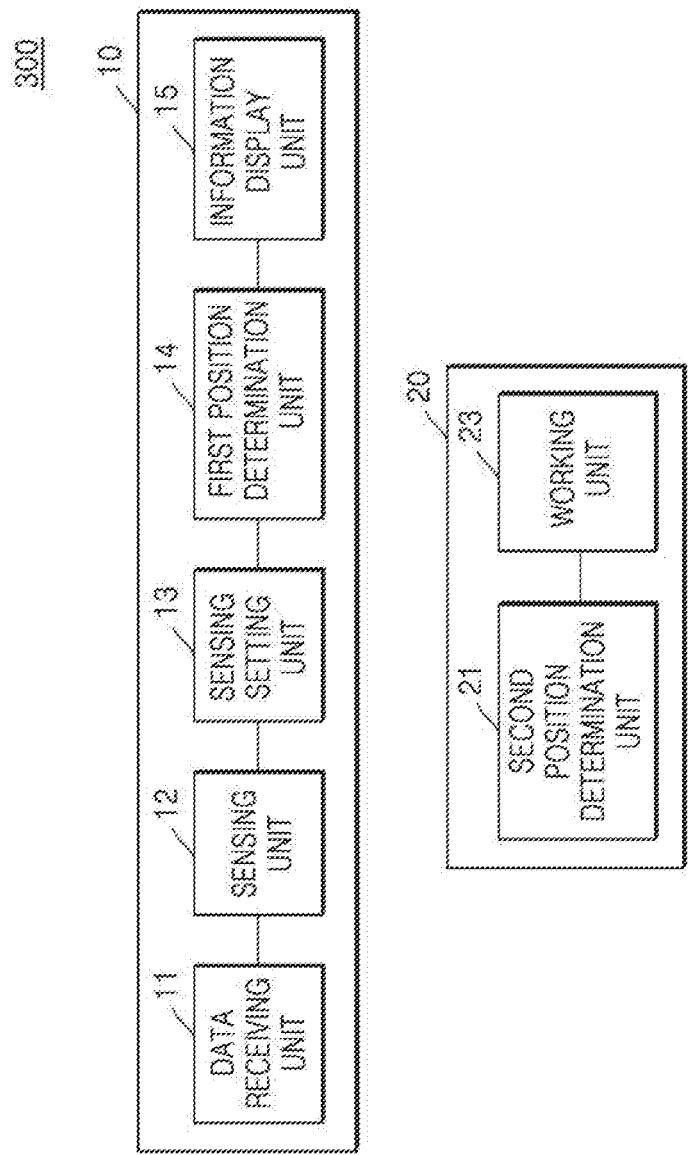
FIG. 5 schematically illustrates a configuration of an autonomous working system according to an embodiment of the present disclosure.

FIG. 5 schematically illustrates a configuration of an autonomous working system according to an embodiment of the present disclosure.

Referring to FIG. 5, an autonomous working system 300 according to another embodiment of the present disclosure includes the master working robot 10 and the slave working robot 20, wherein the master working robot 10 further includes an information display unit 15, and the slave working robot 20 may further include a working unit 23.

The information display unit 15 displays task information on at least a portion of the space targeted for working, and the working unit 23 recognizes the task information and performs a task corresponding to the recognition result. The task information includes information on a task that the slave working robot 20 performs in the space targeted for working, and, corresponds to the task information, the working unit 23 may perform marking, drilling, welding, cutting, screwing, fastening, tightening, locking, punching, or the like. The marking may include marking data using a pigment on the work surface, leaving scratches on the work surface, partially etching the work surface with a laser, and marking data on the work surface by using, for example, a line machine. Therefore, the working unit 23 may further include various tool units, such as a marking unit, a drill, a welding unit, a cutting unit, a screwing unit, a locking unit, a tightening unit, a locking unit, and a punching unit, to perform marking, drilling, welding, cutting, a screwing task, a tightening task, a binding task, a fastening task, or punching.

Optionally, the working unit 23 may include a mowing unit so that the data may be displayed by mowing the lawn when the lawn is planted on the floor.

Optionally, the working unit 23 may include a plate unit to display a three-dimensional shape by pushing sand or a block.

Optionally, the working unit 23 may include a three-dimensional (3D) printing unit to print a 3D shape.

Optionally, the working unit 23 may include an arm unit capable of stacking objects such as blocks in a 3D shape.

Optionally, the working unit 23 may be configured to perform a task of providing a specific device onto a wall, a pillar, a floor, or a ceiling in the space targeted for working. For example, the working unit 23 may perform the task of providing an outlet onto a wall, a pillar, a floor, or a ceiling.

These various embodiments of the working unit 23 may be applied to all embodiments of the present specification.

The task information may be marked in a symbol that the working unit 23 may recognize, for example, in at least one of a barcode, a QR code, a number, or a character. Optionally, the task information may be displayed with a special photosensitizer that the working unit may recognize. For example, the photosensitizer may not be directly identified by the naked eye, and may be recognized by the working unit 23. To this end, the working unit 23 may further include a sensing unit capable of recognizing a special photosensitizer.

When an autonomous working system according to the present disclosure includes a plurality of slave working robots, the information display unit 15 may display different task information corresponding to the respective slave working robots. For example, when the slave working robots include a first robot and a second robot, the information display unit 15 displays task information such as task information corresponding to the first robot is distinguished from task information corresponding to the second robot.

In an embodiment including a plurality of master working robots including, for example, a first master robot and a second master robot, the task information may be displayed such that a single master robot matches a single slave robot or a plurality of slave robots.

Meanwhile, the task information may further include position information corresponding to the position at which the task information is displayed. In this case, the second position determination unit 21 may determine the position of the slave working robot 20 by using the position information.

Since the master working robot 10 can determine its own position, the information display unit 15 has position information to display the task information. Accordingly, the information display unit 15 may include the position information in the task information, and the second position determination unit 21 may determine the position of the slave working robot 20 by recognizing the task information.

The slave working robot 20 may have information on which position to perform the task in advance, but may not be able to determine its own position by itself. Accordingly, by comparing position information included in the task information with information previously held, a task may be performed accurately.

Meanwhile, in another embodiment of the present disclosure, the master working robot 10 may display a separate mark corresponding to the movement path in the space targeted for working while moving along the movement path. For example, when the movement path of the master working robot 10 is a circle, the master working robot 10 may display a path corresponding to the movement path in the space targeted for working to be a circle by using the information display unit 15. As described above, since the information display unit 15 displays task information in the space targeted for working, the master working robot 10 displays a mark corresponding to the movement path by using the information display unit 15 while moving along the movement path, and at the same time, displays the task information.

The slave working robot 20 may move following the master working robot 10 by tracking the path and/or the mark displayed by the information display unit 15, and when task information is detected during movement, the slave working robot 20 may perform a task corresponding to the task information.

The information display unit 15 may display the path and/or the mark to be identifiable with the naked eye, or may be displayed to be non-identifiable with the naked eye and identifiable only through a special device. For example, the information display unit 15 displays the path and/or the mark through, for example, applying a photosensitizer that cannot be identified with the naked eye, and the slave working robot 20 may recognize the path and/or the mark by recognizing the applied photosensitizer by using, for example, an ultraviolet camera. However, the path and/or the mark is not limited thereto, and the path and/or the mark may be displayed to be visible to the naked eye. Accordingly, an administrator may check the accuracy of the path and/or the mark. The path and/or the mark may be formed by using a material that is automatically erased after a period of time after the task is finished, but is not limited thereto, and may be formed by using a material that may be easily erased after the task is finished.

Meanwhile, the path and/or the mark displayed by the information display unit 15 may include position information. For example, the information display unit 15 may make a specific point A on the path and/or the mark to have coordinate information of the point A. In an embodiment, the path and/or the mark may include information on task information displayed in the space targeted for working. For example, a specific point B may be marked with information that when a movement is done from the specific point B by C meter along the path and/or the mark, there would be task information displayed.

Figure 6:
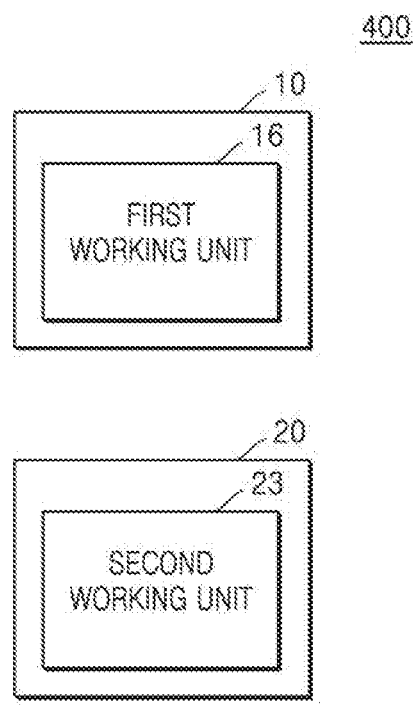
FIG. 6 schematically illustrates a configuration of an autonomous working system according to an embodiment of the present disclosure.

FIG. 6 schematically illustrates a configuration of an autonomous working system according to an embodiment of the present disclosure.

Referring to FIG. 6, an autonomous working system 400 according to another embodiment of the present disclosure includes the master working robot 10 and the slave working robot 20, and the master working robot 10 further includes a first working unit 16, and the slave working robot 20 further includes a second working unit 23. In FIG. 6, configurations of the master working robot 10 and the slave working robot 20 other than the first working unit 16 and the second working unit 23 are not illustrated. However, this is for convenience of description, and the master working robot 10 and the slave working robot 20 in the embodiment illustrated in FIG. 6 may also include other configurations described in the previous embodiments than the first working unit 16 and the second working unit 23.

According to this configuration, the master working robot 10 performs its own task and at the same time instructs the slave working robot 20 to perform a task. Accordingly, the master working robot 10 and the slave working robot 20 may perform tasks obtained by dividing the same task, or perform different tasks at the same time.

To this end, the first working unit 16 and the second working unit 23 may include: various tool units, for example, a marking unit, a drill, a welding unit, a cutting unit, a screwing unit, a fastening unit, a tightening unit, a locking unit, and a punching unit, as described above; a mowing unit; a plate unit; a 3D printing unit; and/or an arm unit. In an embodiment, the first working unit 16 and the second working unit 23 may be configured to perform a task of providing a specific device onto a wall, a pillar, a floor, or a ceiling in the space targeted for working.

Figure 7:
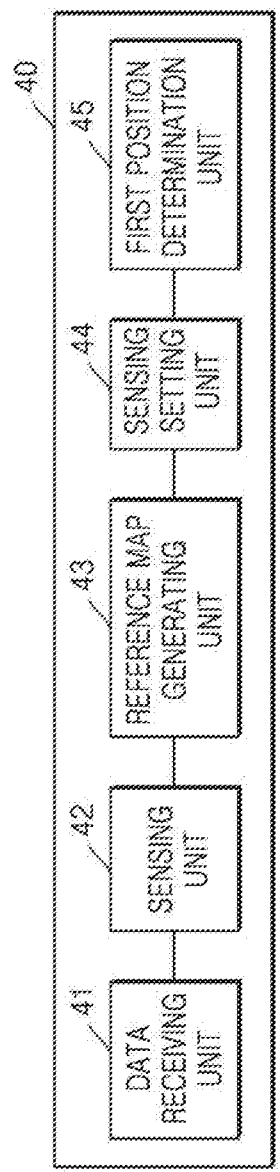
FIG. 7 schematically illustrates a configuration of a master working robot according to an embodiment of the present disclosure.

FIG. 7 schematically illustrates a configuration of a master working robot according to an embodiment of the present disclosure.

Referring to FIG. 7, according to another embodiment of the present disclosure, the master working robot 40 may further include a reference map generation unit 43, wherein the reference map generation unit 43 may generate a reference map from sensing data obtained by the sensing unit at an arbitrary reference position.

As described with reference to FIG. 2, the reference map is used by the first position determination unit 45 to determine the position of the master working robot 10, and may be generated from a drawing corresponding to the space targeted for working. However, the reference map generation unit 43 may directly generate a reference map that may more accurately reflect the actual environment or characteristics of the space targeted for working.

The reference position may be an arbitrary position within the space targeted for working, and generally, a middle point of the space targeted for working may be selected therefor. A position in which an obstacle is present, including a window, may not be suitable as the reference position. This is because when an obstacle exists nearby, it may be difficult to obtain sensing data of a space behind the obstacle and/or a space associated with the obstacle. However, if necessary, the reference position may be an arbitrary position outside the space targeted for working.

In a case where it is difficult to obtain sensing data, for example, in a case of transmitting light without reflection, the reference position may be arranged in the empty space of the space targeted for sensing so that a position where a pillar, an obstacle, or the like may be sensed, may be set as the sensing position.

On the other hand, when it is difficult to obtain complete sensing data due to an obstacle, complete sensing data may be obtained by performing a first sensing at the reference position and then performing a second sensing at an arbitrary position away from the obstacle.

Optionally and/or additionally, the reference map generation unit 43 may measure a distance to a specific point, such as a wall or pillar, by using a distance measurement sensor as described above, and reflect the same in the reference map data. By measuring the distance, for example, the center point of a column such as a pillar may be estimated, and based on the assumption, a reference position may be set.

Optionally and/or additionally, the reference map generation unit 43 may measure the state of a specific surface, such as a floor surface, by using an image capture sensor as described above, and may reflect the same in the reference map data. In consideration of such state measurement, a movement path and/or a work path of a master working robot and/or a slave working robot to be described later may be set.

With the master working robot 40 stopped at the reference position, the sensor rotates 360 degrees to sense the space targeted for working to generate the sensing data. In addition, if necessary, the sensing angle of the sensor included in the sensing unit 42 may be controlled upwards or downwards through tilt control or the like. However, in the process of generating the sensing data for generating the reference map, the position of the master working robot 40 may not be fixed to the reference position, and the sensing data may be generated while the master working robot 40 moves within a predetermined reference space.

The reference map generation unit 43 may generate a reference map of the space targeted for working from the sensing data, and may apply, for example, a SLAM algorithm to the sensing data obtained at the reference position to generate the reference map.

The reference map may be configured to include image data of pixels included in an image frame corresponding to the sensing data. For example, when the space targeted for working is represented as one frame, a pixel corresponding to a position where an object exists may be displayed as black, and a position corresponding to empty space may be displayed as white.

However, this is merely an embodiment of a data format that the reference map data may include, the present disclosure is not limited to including color information regarding an individual pixel, and the reference map data may be represented in a format such as a vector, a polar coordinate, etc.

In another embodiment of the present disclosure, when the drawing corresponding to the space targeted for working and the reference map generated in the reference map generation unit 43 do not match each other, weights may be given to each of the drawing and the reference map, and information on the space targeted for working available in a sensing setting unit 44 may be provided.

Figure 8:
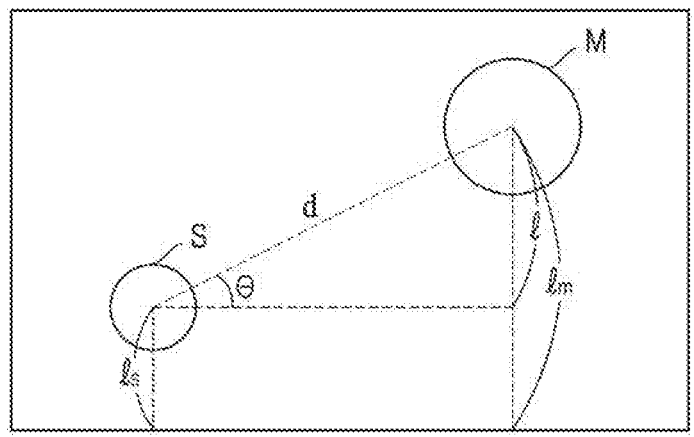
FIG. 8 illustrates a diagram illustrating a method of calculating a position of a slave working robot through the relative positions of a master working robot and a slave working robot.

FIG. 8 illustrates a diagram illustrating a method of calculating a position of a slave working robot through the relative positions of a master working robot and a slave working robot.

Referring to FIG. 8, a master working robot M and a slave working robot S are illustrated, d denotes a distance between the master working robot M and the slave working robot S, and I denotes the difference between the distance from the master working robot M to a specific wall surface of the space targeted for working and the distance from the slave working robot S to the specific wall surface of the space targeted for working. That is, the condition in which $I=I_m-I_s$ is satisfied, $I_m$ denotes the distance from the master working robot M to the specific wall surface of the space targeted for working, and $I_s$ denotes the distance from the slave working robot S to the specific wall surface of the space targeted for working. In addition, θ denotes the angle between the master working robot M and the slave working robot S.

The master working robot M may measure the distance $I_m$ to the wall surface by using a sensor, and the slave working robot S may measure the distance d to the master working robot M and the distance $I_s$ to the wall surface by using the distance measuring unit 22 described with reference to FIG. 3. Accordingly, the distance I may be calculated by using the difference between $I_m$ and $I_s$, and the angle θ value may be calculated by using the distance d measured through the distance measuring unit 22.

The second position determination unit of the slave working robot S may determine the position of the slave working robot S by using the distance d and the angle θ, and position information of the master working robot M provided by the first position determination unit. Therefore, it may be understood that the $I_m$ value calculated by the master working robot M is provided to the second position determination unit together with position information of the master working robot M.

In an embodiment, the second position determination unit may determine the position of the slave working robot S by using coordinates included in the information on the position of the master working robot M and distances from each of the master working robot M and the second position determination unit to a pair of wall surfaces in the space targeted for working. In this case, the position of the slave working robot S may be determined even when the distance d value between the master working robot M and the slave working robot S is not calculated.

In this regard, it is obvious to a person skilled in the art that $I_m$ is the shortest distance between the master working robot M and the wall surface and $I_s$ is the shortest distance between the slave working robot S and the wall surface.

Figure 9:
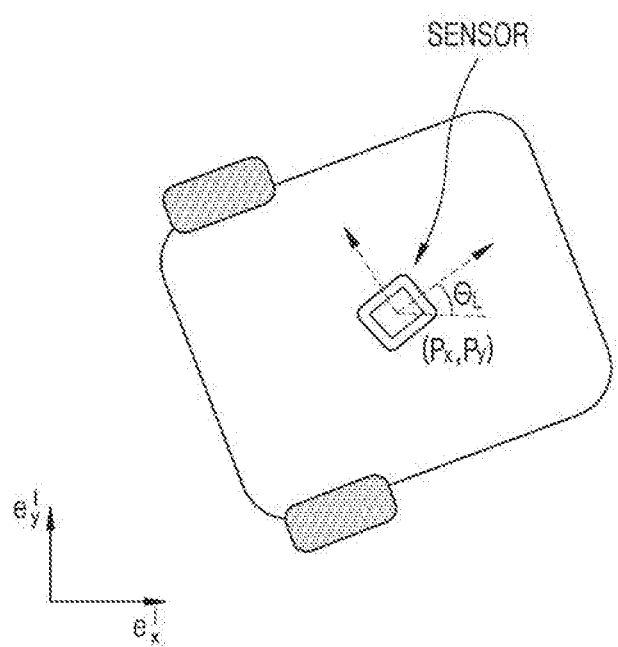
FIG. 9 illustrates an example of the configuration of a working robot to which an autonomous working system is applied, according to the present disclosure.

FIG. 9 illustrates an example of the configuration of a working robot to which an autonomous working system is applied, according to the present disclosure.

Referring to FIG. 9, the working robot, particularly, the master working robot, may include a sensor, for example, a sensor. The working robot may moves by using the configuration illustrated in FIG. 9, for example, a pair of wheels disposed on opposite sides of the body. Although not illustrated in FIG. 9, the working robot may further include at least one wheel at a lower portion thereof, through which the working robot may maintain the balance. However, the present disclosure is not limited thereto, and any configuration that provides power to the working robot to enable movement to an arbitrary position may be included.

For example, the working robot may be configured to be able to fly like a drone, and may be configured through a plurality of pairs of driving devices. In addition, the working robot may be configured to move or perform a task even underwater. In an embodiment, the working robot may be configured to be movable through a structure that mimics the legs of humans or animals.

As described with reference to FIG. 2, since the position of the master working robot may be determined through the sensor, it may be considered that the position of the master working robot is substantially the same as the position of the sensor. However, the present disclosure is not limited to the present embodiment. For example, the position of a working unit of the master working robot may be defined as the position of the master working robot, and the position of the working unit may be accurately adjusted by using the predetermined difference between the position of the sensor and the position of the working unit. Hereinafter, in this specification, for convenience, it is assumed that the position of the sensor and the position of the master working robot are substantially the same.

The position of the working robot may be expressed in coordinates of (px, py) and may be rotated by a motor. In addition, the rotation direction of the sensor may be variously controlled according to the purpose. In this regard, an angle of the sensor may be denoted based on an x-axis of FIG. 9, and a position of an object detected by the sensor may be denoted by polar coordinates of $(\theta_L, d)$. In this regard, d denotes a distance to the detected object.

Meanwhile, the master working robot may include a marking unit (not shown). The marking unit may be configured to freely move up and down, left and right to perform a task corresponding to the marking data included in the information corresponding to the space targeted for working received by the data receiving unit 11 described with reference to FIG. 2, and may display a certain mark at a specific position of the work surface corresponding to marking data or draw a line on the movement path.

Figure 10:
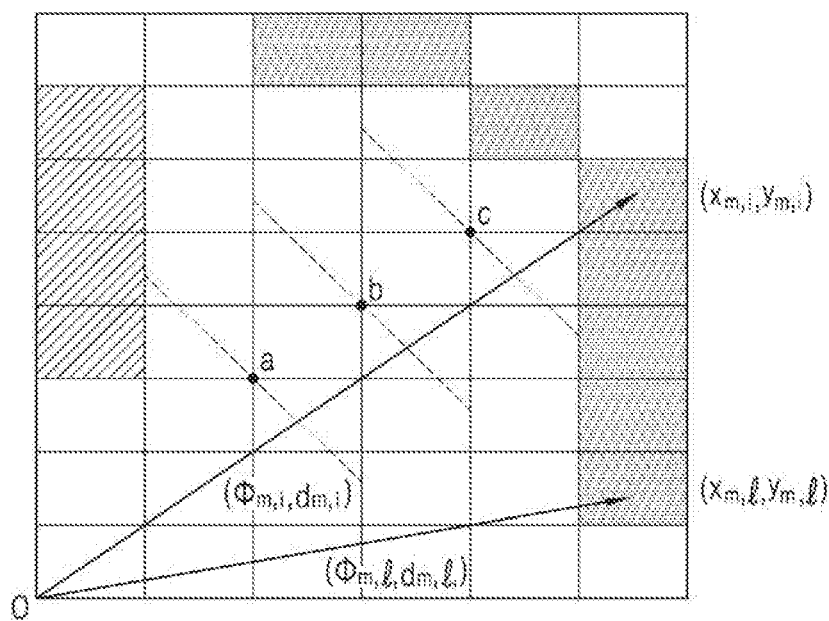
FIG. 10 illustrates an example of a data conversion process in which reference map data is compared with sensing data to determine the position of a master working robot.

FIG. 10 illustrates an example of a data conversion process in which reference map data is compared with sensing data to determine the position of a master working robot.

Referring to FIG. 10, the reference map data may be represented in a grid format, and portions darker than other gird areas denote presence of an object reflecting a signal of a laser sensor. Each grid area may be represented as coordinates such as $(x_{m,i}, y_{m,i})$ and $(x_{m,l}, y_{m,l})$.

The first position determination unit 14 according to an embodiment of the present disclosure described with reference to FIG. 2 performs the operation of comparing the reference map data and sensing data in order to determine the position of the master working robot 10. Unlike the reference map data including grid data, the sensing data includes data on a distance to and an angle with respect to an object. Accordingly, the first position determination unit 14 may convert the grid-type reference map data into distance data and angle data to compare the reference map data with the sensing data.

Referring to FIG. 10, a position represented as coordinates of $(x_{m,i}, y_{m,i})$ and $(x_{m,l}, y_{m,l})$ in the reference map data may be converted into polar coordinate data of $(\phi_{m,i}, d_{m,i})$ and $(\phi_{m,l}, d_{m,l})$, respectively, and the polar coordinate data matches a data format of the sensing data. Accordingly, the first position determination unit 14 may directly compare the converted reference map data and the sensing data, and determine the position of the master working robot 10 by using the comparison result.

However, each of the reference map data and the sensing data is not limited to a grid format and a polar coordinate format, respectively, and the present disclosure is not limited to converting data in the grid format into the polar coordinate format to compare two types of data. Accordingly, the reference map data and the sensing data may be represented as data of other types instead of the grid format and the polar coordinate format, and it is also possible to compare two types of data by converting the sensing data so as to correspond to a format of the reference map data.

In FIG. 10, although a plurality of grid areas may be understood as corresponding to respective pixels when represented through a display apparatus, the present disclosure is not limited thereto, and one grid area may correspond to a group of a plurality of pixels. The reference point for converting polar coordinates is not limited to the origin (0) as illustrated in FIG. 9.

Meanwhile, when the sensing unit 12 obtains sensing data for an object present in the space targeted for working, the first position determination unit 14 compares the distance/angle data corresponding to the sensing data with the converted reference map data to determine whether there is matching data.

As a result of the determination, there may be various pieces of matching data, and the first position determination unit 14 may compare many pieces of sensing data with the converted reference map data to improve the accuracy in determining the position of the master working robot 10.

The first position determination unit 14 may determine the most reliable position as a position of the master working robot 10 by comparing each of many pieces of sensing data with the reference map data.

For example, when first sensing data to n-th sensing data are obtained by using the sensor at the same position, the first position determination unit 14 may search for reference map data corresponding to the first sensing data. As a search result, there may be m pieces of reference map data corresponding to the first sensing data, and the first position determination unit 14 may compare the second sensing data with the m pieces of reference map data. After such a process is repeatedly performed, a position where the first sensing data to n-th sensing data are obtained, that is, a position of the master working robot 10 may be ultimately detected.

To detect a position of the master working robot 10 by comparing reference map data with sensing data, the first position determination unit 14 may use most recently obtained sensing data.

In FIG. 10, positions a, b, and c are examples of some positions on a movement path of the master working robot 10, and description is given below assuming that the master working robot 10 moves from position a to position c and the sensor faces a direction from position a toward position c.

The sensor may obtain sensing data by performing a sensing operation, for example, a scanning operation at positions a, b, and c, and when the sensor may sense only a limited range, for example, when the sensor may sense a total range of 180 degrees with ±90 degrees with respect to the front, referring to FIG. 10, data amounts of sensing data obtained through the sensor at respective positions a, b, and c may be different from one another.

For example, an amount of sensing data obtained at position a may be greater than an amount of sensing data obtained at position c. In this regard, to detect a position of the master working robot 10 by comparing reference map data with sensing data when the master working robot 10 is at position c, the first position determination unit 14 may compare sensing data obtained at position b with the reference map data.

Since an amount of sensing data obtained at position a is greater than that of sensing data obtained at position b, computational speed may be increased by comparing the sensing data obtained at position b with the reference map data.

Since the sensor may obtain sensing data by continuously performing sensing, for example, scanning, and the first position determination unit 14 may continuously detect an accurate position of the master working robot 10 by using the sensing data, using data obtained at a time closest to a current time may be a way of improving accuracy of position detection.

Figure 11:
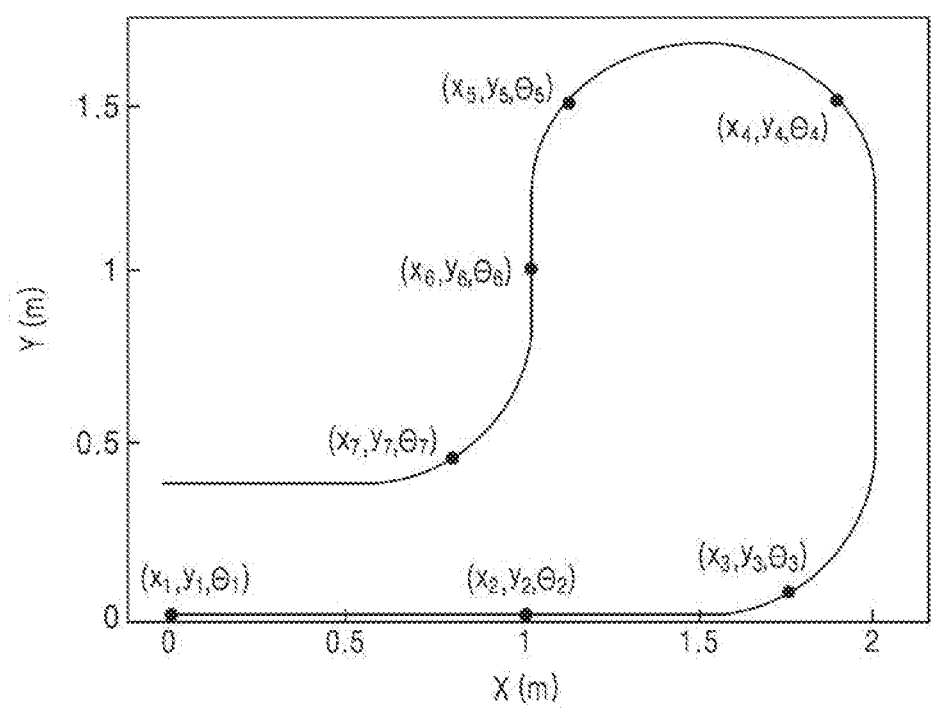
FIG. 11 illustrates a diagram showing an example of a movement path of a master working robot according to an embodiment of the present disclosure.

FIG. 11 illustrates a diagram showing an example of a movement path of a master working robot according to an embodiment of the present disclosure.

The movement path of the master working robot may include information on at least one sensing position and a sensing angle of the sensor. Referring to the embodiment illustrated in FIG. 11, the master working robot performs a sensing operation, for example, a scanning operation, by using the sensor at a first point (x1, y1, θ1) to a seventh point (x7, y7, θ7).

FIG. 11 illustrates several specific sensing positions where the master working robot performs a sensing operation, and this is intended to accurately identify a position of the master working robot.

However, a master working robot according to another embodiment of the present disclosure may continuously perform a sensing operation while moving along the movement path set without designating a specific sensing position.

Meanwhile, the sensing angle refers to the sensing angle of the sensor at each sensing position and may be expressed in degrees or radians. A size of the sensing angle may be represented based on an x-axis or may be represented based on an angle of the sensor corresponding to a time when a sensing operation at the very previous sensing position is finished.

At each of the sensing positions, the master working robot stops, and while stopped at the sensing position, the sensor is rotated to sense the surrounding space. However, as described above, the master working robot may continuously perform a sensing operation while moving along the movement path set without designating a specific sensing position. Accordingly, this may be understood as not performing a stop operation at the sensing position.

In addition, whether or not a position of the master working robot matches the movement path may be determined by comparing sensing data obtained through the sensing operation with the reference map data.

Accordingly, through an autonomous working system according to an embodiment of the present disclosure, the master working robot may perform an operation of marking a specific mark or drawing a line at a corresponding position according to marking data while moving along a set movement path.

At the same time, whether or not a position of the master working robot matches the movement path, which is previously set, may be determined through a sensing operation performed through the sensor at a plurality of sensing positions, and when the position of the master working robot does not match the movement path, the position may be controlled to move along the movement path.

Although FIG. 11 illustrates a total of 7 sensing positions, the present disclosure is not limited thereto, and the sensing position may be variously changed according to positions of a pillar, a window, an obstacle, etc. in the space targeted for sensing. In addition, when there is empty space within the space targeted for sensing, sensing may be difficult to be performed in the empty space, and thus, the plurality of sensing positions and the sensing angle may be set by taking into account a position of the empty space.

Figure 12:
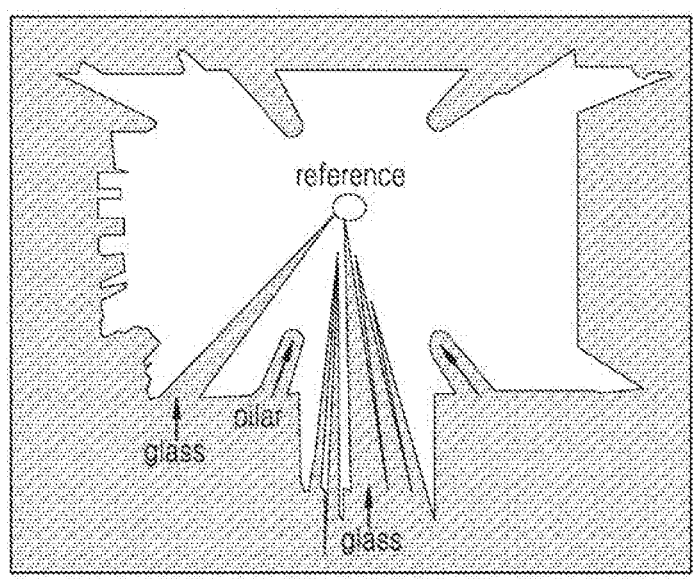
FIG. 12 illustrates an example of a reference map obtained through a master working robot, according to an embodiment of the present disclosure.

FIG. 12 illustrates an example of a reference map obtained through a master working robot, according to an embodiment of the present disclosure.

FIG. 12 illustrates a reference map obtained by using sensing data obtained through a sensor at a reference position, and it may be found that reflection of a scan signal does not occur at a position where glass exists and thus normal sensing data is not obtained starting from a position of the glass to the reference position.

It may also be found that sensing data is not normally obtained starting from space behind a pillar. Accordingly, when the reference map is generated using the sensing data obtained through the sensor, a position where the glass exists and a position where the pillar or an obstacle exists within space targeted for sensing may be roughly determined.

When the reference map is generated by using sensing data obtained by rotating a sensor that is in a stop state, a distance increases according to a size of the space targeted for sensing, and thus, the degree of accuracy may decrease. Accordingly, the reference map may be used as reference data to set a movement path, a sensing position, and a sensing angle of the master working robot.

In addition, when a drawing for the space targeted for working exists, using the drawing and the reference map together may help to implement a more accurate operation of the master working robot.

A movement path, a sensing position and/or a sensing angle of the master working robot may be set to obtain accurate sensing data regarding the space targeted for sensing, and in FIG. 9, a position and an angle spaced as far as possible from the glass and the pillar, including the reference position, may be set.

Figure 13:
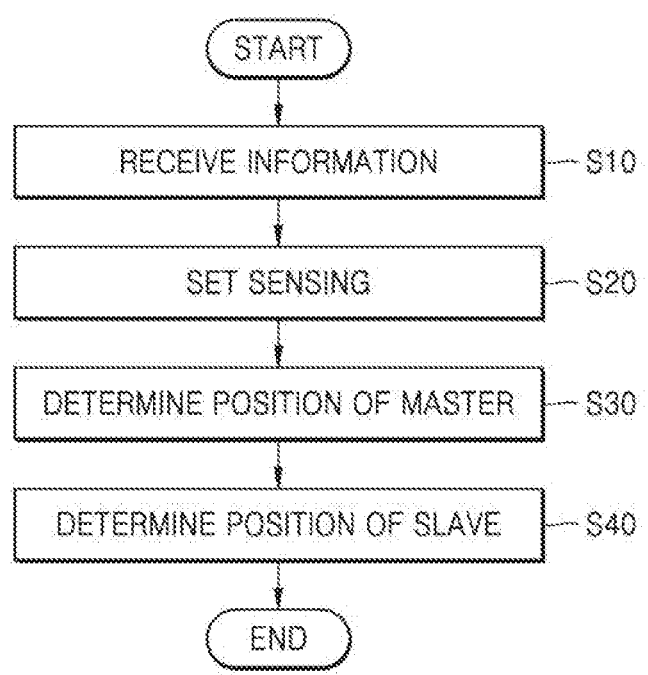
FIG. 13 schematically illustrates an autonomous working method according to an embodiment of the present disclosure.

FIG. 13 schematically illustrates an autonomous working method according to an embodiment of the present disclosure.

An autonomous working method according to an embodiment of the present disclosure is an autonomous working method using an autonomous working system including a master working robot and at least one slave working robot. Referring to FIG. 13, the autonomous working method includes an information receiving operation (S10) and a sensing setting operation (S20), a master position determining operation (S30), and a slave position determining operation (S40).

In the information receiving operation (S10), information on space targeted for working is received. The space targeted for working refers to a space in which the master working robot and the slave working robot perform tasks, and the information received in the information receiving operation (S10) may include information on a drawing corresponding to the space targeted for working, and the position and size of walls, pillars, windows, etc. existing in the space targeted for working, for example, information on architectural and spatial elements of the space targeted for working. In addition, in the information receiving operation (S10), information on a task that the master working robot and the slave working robot perform in the space targeted for working may be received.

Meanwhile, the information on the space targeted for working may include information on the allowable movement ranges of the master working robot and the slave working robot. For example, the space targeted for working may include a space in which walls, pillars, windows, etc. are to be provided, and there may be a space that the master working robot and the slave working robot are not allowed to enter before the providing of walls, pillars, windows, etc. In space where a wall has to be built or an elevator has to be installed, a floor surface may be discontinuous before a task is actually performed, and in some cases, the master working robot and the slave working robot may be in danger of falling. Accordingly, the information on the space targeted for working may include information on the allowable movements range to limit the movement ranges of the master working robot and the slave working robot. In addition, the information on the space targeted for working may include a specific point, such as a center position of a wall or pillar. These specific points may be used as a reference point during the movement and/or working of a master working robot and/or a slave working robot.

In the information receiving operation (S10), the sensor included in the master working robot may be wired or wirelessly, electrically or non-electrically connected and thus data obtained from the sensor may be received. In addition, in the information receiving operation (S10), data on the space targeted for working stored in an external storage medium may be received. Optionally, in the information receiving operation (S10), data on the space targeted for working input from the input unit of the master working robot may be received. Optionally, in the information receiving operation (S10), a master working robot may be electrically connected to a separate computing apparatus and thus may receive data regarding the space targeted for working from the computing apparatus.

Meanwhile, the sensor may measure and/or calculate a distance to an object, sense the shape of an object, or sense a movement of a master working robot. Such a sensor may include a sensor using a laser or a sound wave, light wave and/or radio wave, an IMU sensor, a GPS sensor, and/or an image obtaining sensor capable of obtaining a moving image and/or a still image, such as a camera. When the sensor includes a laser sensor, a LiDAR sensor may be included as an example of the laser sensor.

The master working robot may include at least one sensor described above, and the sensing precision degree may be improved by combining different types of sensors. For example, the sensing precision degree with respect to the space targeted for working may be improved by sensing the movement of the master working robot using a LiDAR sensor, as a laser sensor, and an IMU sensor. In addition, a camera sensor may be optionally and/or additionally included to allow the camera sensor to capture an image of the space targeted for working. For example, an image of a state and/or texture of a certain surface, particularly, a floor surface of the space targeted for working may be captured, and thus, a movement and/or work path of the master working robot and/or the slave working robot may be set and/or corrected. In addition, a distance measurement sensor may be optionally and/or additionally included, and thus, a distance to a specific point, for example, a wall or a pillar, may be calculated. Accordingly, it is possible to reflect the measured position of a specific point existing in the space targeted for working in setting and/or correcting the movement and/or work path of the master working robot and/or the slave working robot. The various sensor combinations as described above do not need to be provided only to the master working robot, and some sensors are provided to the slave working robot, and the corresponding data is provided to the master working robot through communications. Accordingly, before and/or during working, the movement and/or work path of the master working robot and/or the slave working robot may be set and/or corrected.

The master working robot may sense the surrounding space using the sensor in a stationary state and/or while moving, and may use the information on reflected signal of a signal output from the sensor to obtain the position of the object in the surrounding space in the form of polar coordinates. The motor allows the sensor to rotate as much as a target angle, for example, 360 degrees, and the rotation direction of the sensor may be variously controlled according to the purpose.

Meanwhile, horizontal rotation, horizontal movement, tilt and/or vertical movement of the sensor may be controlled by a separate driving unit. Horizontal rotation, horizontal movement, tilt and/or vertical movement of the sensor may be controlled independently of one another, and control signals for controlling the horizontal rotation, horizontal movement, tilt and/or vertical movement may also be independently generated and be provided to the driving unit.

In the sensing setting operation (S20), a movement path, a sensing position, and a sensing angle at the sensing position of the master working robot may be set. In an embodiment, in the sensing setting operation (S20), the movement path is set, and an arbitrary point on the movement path is designated and the designated point is set as a sensing position. In addition, depending on the space targeted for working, if needed, the sensing position may be set to a plurality of positions. Correspondingly, when the master working robot reaches the sensing position, the sensor performs a sensing operation. In this case, the sensor rotates according to the sensing angle set in the sensing setting operation (S20).

Meanwhile, in another embodiment of the present disclosure, a sensing height of the sensor may be adjusted, and at the sensing position set in the sensing setting operation (S20), a sensing angle and a sensing height of the sensor may be set together. In addition, the sensing position and the sensing angle may be set in consideration of the characteristics of the space targeted for working.

In a case where it is difficult to obtain sensing data, for example, in a case of transmitting light without reflection, the sensing position and the sensing angle may be arranged in empty space of the space targeted for working so that a position and an angle where a pillar, an obstacle, or the like may be sensed, may be set as the sensing position and the sensing data.

In the case where there is a drawing of the space targeted for working, in the sensing setting operation (S20), the movement path, the sensing position, and the sensing angle of the sensor at the sensing position may be set by taking the drawing into account.

The master working robot may be understood as performing a sensing operation at a specific position on the movement path. The specific sensing position is designated to accurately identify a position of the master working robot.

The specific position may be set as a limited number of positions, but is not limited thereto. In some embodiments, a sensing operation may be continuously performed while moving on the movement path.

Meanwhile, the sensing angle refers to the sensing angle of the sensor at each sensing position and may be expressed in degrees or radians. In addition, the size of the sensing angle may be expressed based on a specific coordinate axis, for example, an x-axis, or may be expressed based on an angle of the sensor at a point in time when a sensing operation in the very previous sensing position is ended.

In the sensing setting operation (S20), an operation signal may be transmitted to a plurality of driving units of the master working robot so as to set the movement path of the master working robot, a sensing position, and a sensing angle of the sensing unit.

In one embodiment of the present disclosure, the master working robot stops at each of the sensing positions, and the sensor is rotated while the sensor is stopped at the sensing positions to sense the surrounding space. In another embodiment of the present disclosure, the master working robot may not stop at the sensing position and may sense the surrounding space through the sensor during moving.

In the master position determining operation (S30), the position of the master working robot is determined by comparing the sensing data obtained at the sensing position with reference map data.

The reference map data may be represented as coordinates of pixels included in an image frame, and coordinates of a pixel corresponding to a position where an object exists may have a different value from coordinates of a pixel corresponding to an empty position. As described above, data obtained through the sensor may be obtained in the form of polar coordinates, and when the reference map data is compared with the sensing data, a position of the master working robot in the space targeted for working may be determined. In this case, as described above, a specific point reflected in the reference map data, for example, the center of a wall or pillar, may be compared with the sensing data.

In the master position determining operation (S30), the reference map data is converted into data in the form of polar coordinates obtained through the sensor, and the data obtained by the conversion is compared with the sensing data.

In another embodiment of the present disclosure, in the master position determining operation (S30), a position signal output from a transceiver (not shown) provided at an arbitrary position may be received, and the position of the master working robot may be determined from the position signal. When the position of the transceiver is determined, in the master position determining operation (S30), the position of the master working robot may be determined based on the position of the transceiver. In an embodiment, in the master position determining operation (S30), the position of the master working robot may be determined in consideration of the distance from the master working robot to the transceiver, angle data between the master working robot and the transceiver, and information on the position of the transceiver.

Optionally, in the master position determining operation (S30), the position of a marker (not shown) provided at an arbitrary position is sensed, and the position of the master working robot may be determined from the marker. For example, in the master position determining operation (S30), the position of the master working robot 10 may be determined in reverse from a position where the position of the marker is sensed and/or the analysis of the sensing data.

The operation performed in the master position determining operation (S30) aims to determine the position of the master working robot as accurately as possible, and the transceiver and/or marker is attached to an arbitrary position of the space targeted for working, for example, a pillar or a wall surface, thereby transmitting the position signal and/or showing a position.

However, a location of the transceiver and/or the marker is not limited to an arbitrary position inside the space targeted for sensing. For example, when the space targeted for working is open space, a position of the master working robot may be traced even when the transceiver and/or the marker is positioned outside the space targeted for working.

The master working robot 10 may include a receiver (not shown) capable of determining a position of the transceiver receiving the position signal and transmitting the received position signal and a distance and/or an angle with respect to the transceiver, and the receiver may determine a position of the master working robot 10 by taking into account a position signal received from at least one transceiver.

The transceiver may be configured through, for example, a signal sharer or a beacon and may be used when it is difficult to determine an accurate position of the master working robot through comparison between the sensing data and the reference map data.

The marker may mark a certain color or shape or a predetermined number, and a receiver of may determine a position of the master working robot by recognizing the color, the shape, or the number. Meanwhile, the marker may be displayed to be identifiable through a special device such as an ultraviolet camera.

In the slave position determining operation (S40), the position of the slave robot is determined. In the slave position determining operation (S40), various methods may be used to determine the position of the slave working robot, and the method used to determine the position of the master working robot in the master position determining operation (S30) may be applied. For example, in the slave position determining operation (S40), a position signal output from a transceiver provided at an arbitrary position may be received, and from the position signal, the position of the slave working robot may be determined. Optionally, in the slave position determining operation (S40), the position of the slave working robot may be determined by sensing the position of the marker provided at an arbitrary position. In the slave position determining operation (S40), the detailed method of determining the position of the slave working robot is the same as the detailed method of determining of the master working robot in the master position determining operation (S30), and thus a detailed description thereof will be omitted.

In an embodiment, in the slave position determining operation (S40), the position information of the master working robot and a relative position relationship between the slave working robot and the master working robot may be considered to determine the position of the slave working robot.

For example, in the slave position determining operation (S40), information on the position of the master working robot is received, and by considering the received position information and the distance and angle between the slave working robot and the master working robot, the position of the slave working robot is determined.

The master working robot may determine its own position in a master position determining operation (S30), and the information on the position of the master working robot may be provided to the slave working robot. At this time, when relative position information, such as angle information, between the master working robot and the slave working robot is obtained, the position of the slave working robot may be determined using the information on the position of the master working robot.

Meanwhile, in the slave position determining operation (S40), the information on the position of the master working robot may be provided in real time from the master position determining operation (S30). Since the master working robot and the slave working robot may continuously move in the space targeted for working, when the information on the position of the master working robot is provided in real time, the position of the slave working robot may be more accurately determined.

Figure 14:
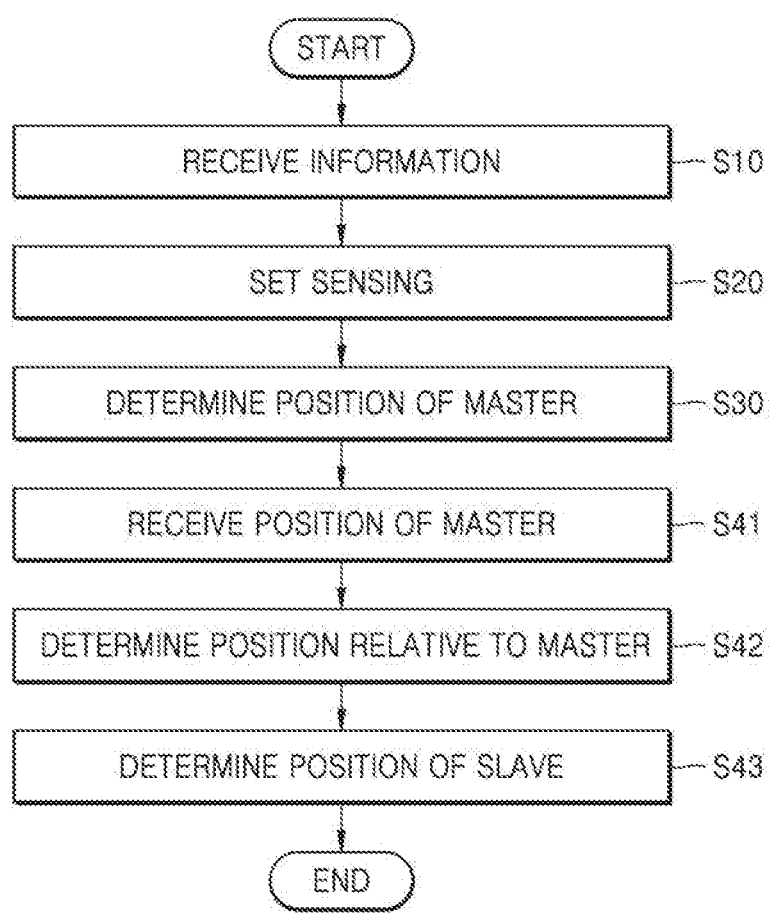
FIG. 14 schematically illustrates an autonomous working method according to an embodiment of the present disclosure.

FIG. 14 schematically illustrates an autonomous working method according to an embodiment of the present disclosure.

Referring to FIG. 14, the autonomous working method according to another embodiment of the present disclosure includes the information receiving operation (S10), the sensing setting operation (S20), the master position determining operation (S30), a master position receiving operation (S41), a relative-position-to-master determining operation (S42), and a slave position determining operation (S43). The information receiving operation (S10), the sensing setting operation (S20), the master position determining operation (S30), and the slave position determining operation (S43) are substantially the same as the information receiving operation (S10), the sensing setting operation (S20), the master position determining operation (S30), and the slave position determining operation (S40). Accordingly, redundant descriptions thereof will be omitted herein.

In the master position receiving operation (S41), the information on the position of the master working robot is received, and in the relative-position-to-master determining operation (S42), the distance and the angle between the slave working robot and the master working robot are calculated.

As described with reference to FIGS. 3 and 8, the slave working robot may measure and/or calculate a distance to the master working robot by using a distance calculation unit and may also measure and/or calculate a distance to a certain wall surface. Likewise, the master working robot may measure and/or calculate the distance to the wall surface by using a sensor or the distance calculation unit provided in the slave working robot.

When the information on the position of the master working robot is received in the master position receiving operation (S41), the position of the slave working robot may be determined by using the relative position obtained in the relative-position-to-master determining operation (S42). Here, the relative position may be considered to refer to a distance between a master working robot and a slave working robot and an angle between the master working robot and the slave working robot, or distances from the master working robot and the slave working robot to a pair of wall surfaces.

Figure 15:
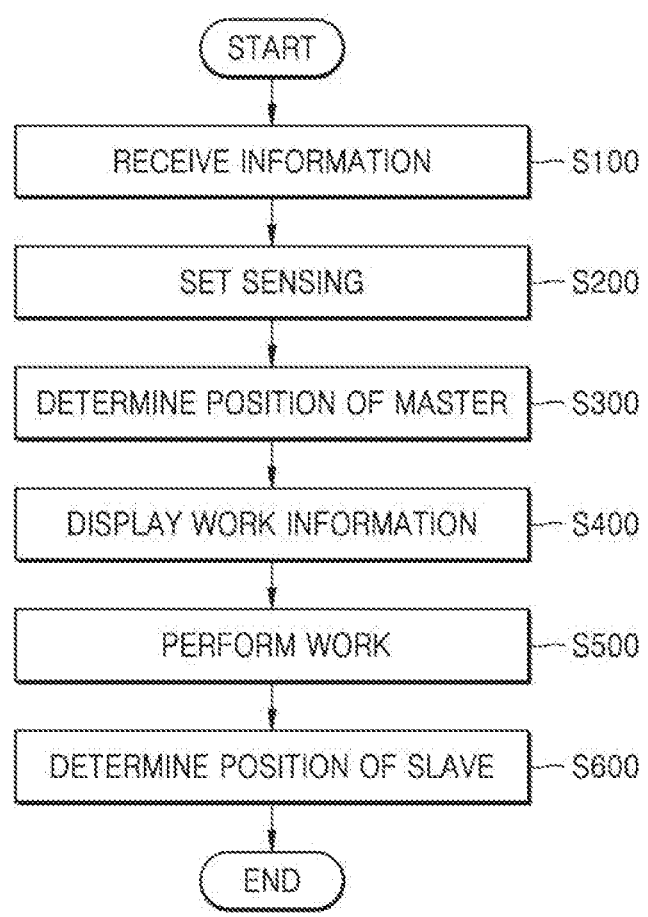
FIG. 15 schematically illustrates an autonomous working method according to an embodiment of the present disclosure.

FIG. 15 schematically illustrates an autonomous working method according to an embodiment of the present disclosure.

Referring to FIG. 15, an autonomous working method according to another embodiment of the present disclosure includes an information receiving operation (S100), a sensing setting operation (S200), a master position determining operation (S300), a task information displaying operation (S400), a task performing operation (S500), and a slave position determining operation (S600). The information receiving operation (S100), the sensing setting operation (S200), the master position determining operation (S300), and the slave position determining operation (S600) are substantially the same as the information receiving operation (S10) and sensing setting operation (S20), the master position determining operation (S30), and the slave position determining operation (S40). Accordingly, redundant descriptions thereof will be omitted herein.

In the task information displaying operation (S400), the master working robot displays task information in the space targeted for working. In the task performing operation (S500), the slave working robot recognizes the task information and performs a task corresponding to the recognition result.

The task information includes information on a task that the slave working robot performs in the space targeted for working, and, corresponds to the task information, the slave working robot may perform marking, drilling, welding, cutting, screwing, fastening, tightening, locking, punching, or the like. The marking may include marking data using a pigment on the work surface, leaving scratches on the work surface, partially etching the work surface with a laser, and marking data on the work surface by using, for example, a line machine.

Optionally, the slave working robot may perform a mowing task so that the data may be displayed by mowing the lawn when the lawn is planted on the floor.

Optionally, the slave working robot may perform a task to display a three-dimensional shape by pushing sand or a block.

Optionally, the slave working robot may perform a 3D printing task to print a 3D shape.

Optionally, the slave working robot may perform a task to stack objects such as blocks in a 3D shape.

Optionally, the slave working robot may be configured to perform a task of providing a specific device onto a wall, a pillar, a floor, or a ceiling in the space targeted for working.

The task information may be marked in a symbol that the slave working robot may recognize, for example, in at least one of a barcode, a QR code, a number, or a character. Optionally, the task information may be displayed with a special photosensitizer that the working unit may recognize. For example, the photosensitizer may not be directly identified by the naked eye, and may be recognized by the working unit 23. To this end, the working unit 23 may further include a sensing unit capable of recognizing a special photosensitizer.

When an autonomous working system according to the present disclosure includes a plurality of slave working robots, in the task information displaying operation (S400), the slave working robots may display different task information corresponding to the respective slave working robots. For example, when the slave working robots include a first robot and a second robot, in the task information displaying operation (S400), task information may be displayed such that task information corresponding to the first robot is distinguishable from task information corresponding to the second robot.

In an embodiment including a plurality of master working robots including, for example, a first master robot and a second master robot, the task information may be displayed such that a single master robot matches a single slave robot or a plurality of slave robots.

Meanwhile, in the slave position determining operation (S600), the position of the slave working robot may be determined by using position information included in the task information. Since the master working robot can determine its own position by itself, the task information displayed in the task information displaying operation (S400) has position information on the corresponding position. Accordingly, in a task information displaying operation (S400), the position information may be included in the task information, and in a slave position determining operation (S600), the position of the slave working robot may be determined by recognizing the task information.

The slave working robot may have information on which position to perform the task in advance, but may not be able to determine its own position by itself. Accordingly, by comparing position information included in the task information with information previously held, a task may be performed accurately.

Meanwhile, in another embodiment of the present disclosure, the master working robot may display a separate mark corresponding to the movement path in the space targeted for working while moving along the movement path. For example, when the movement path of the master working robot is a circle, the master working robot may display a path corresponding to the movement path in the space targeted for working to be a circle. As described above, while moving along the movement path, the master working robot may display a mark corresponding to the movement path and perform a task to display the task information.

The slave working robot may move following the master working robot by tracking the displayed path and/or the mark, and when task information is detected during movement, the slave working robot may perform a task corresponding to the task information detected at the corresponding position.

The master working robot may display the path and/or the mark to be identifiable with the naked eye, or may be displayed to be identifiable only through a special device. For example, the master working robot displays the path and/or the mark through, for example, applying a photosensitizer that cannot be identified with the naked eye, and the slave working robot may recognize the path and/or the mark by recognizing the applied photosensitizer by using imaging equipment, for example, an ultraviolet camera. However, the path and/or the mark is not limited thereto, and the path and/or the mark may be displayed to be visible to the naked eye. Accordingly, an administrator may check the accuracy of the path and/or the mark. The path and/or the mark may be formed by using a material that is automatically erased after a period of time after the task is finished, but is not limited thereto, and may be formed by using a material that may be easily erased after the task is finished.

Meanwhile, the path and/or the mark displayed by the master working robot may include position information. For example, the master working robot may make a specific point A on the path and/or the mark to have coordinate information of the point A. In an embodiment, the path and/or the mark may include information on task information displayed in the space targeted for working. For example, a specific point B may be marked with information that when a movement is done from the specific point B by C meter along the path and/or the mark, there would be task information displayed.

Optionally, like a slave working robot, the master working robot may perform various tasks. Accordingly, the master working robot performs its own task and at the same time instructs a task to the slave working robot. Accordingly, the master working robot and the slave working robot may perform tasks obtained by dividing the same task, or perform different tasks simultaneously.

All the embodiments of the present disclosure described above may be applied in combinations to other embodiments.

The present disclosure may be embodied as computer-readable code in a computer-readable recording medium. The computer-readable recording medium may be any recording apparatus capable of storing data readable by a computer system. Examples of the computer-readable recording medium include read-only memory (ROM), random-access memory (RAM), CD-ROM, a magnetic tape, a floppy disk, and an optical data storage device.

In addition, the computer-readable recording medium may be distributed over network-coupled computer systems so that the computer-readable code may be stored and executed in a distributive manner. In addition, functional programs, code, and code segments for embodying the present disclosure may be easily inferred by programmers skilled in the art to which the present disclosure pertains.

The operations of all methods described herein may be performed in any suitable order unless otherwise indicated herein or otherwise clearly contradicted by the context. However the present disclosure is not limited to any order of operations indicated above.

The use of any and all examples or exemplary language (e.g., "such as") provided herein is intended merely to better illuminate the present disclosure and does not pose a limitation on the scope of the present disclosure unless otherwise claimed. It will be understood by one of ordinary skill in the art that various modifications, adaptations, and changes may be made according to design conditions and factors without departing from the scope of the appended claims and equivalents thereof.

Accordingly, the spirit of the present disclosure should not be limited to the embodiments described above, and it will be understood that not only the appended claims but also all the scopes equivalent of the claims or equivalently changed therefrom are included in the spirit of the disclosure.

INDUSTRIAL AVAILABILITY

The present disclosure may be used for an autonomous working system, an autonomous working method, and a computer readable recording medium, in which a plurality of working robots including a position determine function are used.

The invention claimed is:

1. An autonomous working system comprising a master working robot and at least one slave working robot, wherein the master working robot comprises:
    a data receiving unit to receive information on space targeted for working;
    a sensing unit to sense the space targeted for working;
    a sensing setting unit to set a movement path of the master working robot, a sensing position, and a sensing angle of the sensing unit; and
    a first position determination unit to determine a position of the master working robot by comparing sensing data obtained through the sensing unit at the sensing position with reference map data, and
the at least one slave working robot comprises
    a second position determination unit that determines a position of the at least one slave working robot,
the master working robot further comprises an information display unit to display task information on the space targeted for working,
the at least one slave working robot further comprises a working unit to recognize the task information and perform a task corresponding to the recognition result, and
a position at which the task information is displayed exists on the movement path of the master working robot.

2. The autonomous working system of claim 1, wherein the second position determination unit receives the information on the position of the master working robot, and determines the position of the at least one slave working robot in consideration of the received position and the distance and angle between the at least one slave working robot and the master working robot.

3. The autonomous working system of claim 2, wherein the at least one slave working robot further comprises a distance calculation unit to calculate a distance to the master working robot and a distance to a specific point of the space targeted for working.

4. The autonomous working system of claim 2, further comprising
a position information management unit to receive information on the position of the master working robot from the first position determination unit, wherein
the second position determination unit receives the information on the position of the master working robot from the position information management unit.

5. The autonomous working system of claim 1, wherein the second position determination unit receives a position signal output from a transceiver provided at an arbitrary position, and determines the position of the at least one slave working robot from the position signal.

6. The autonomous working system of claim 1, wherein the task information further comprises position information corresponding to the position at which the task information is displayed, and
the second position determination unit determines the position of the at least one slave working robot by using the position information.

7. The autonomous working system of claim 1, wherein the sensing setting unit sets the sensing position for sensing the space targeted for working in consideration of reference map data corresponding to the space targeted for working.

8. The autonomous working system of claim 7, wherein the master working robot further comprises
a map generating unit to generate the reference map from sensing data obtained through the sensing unit at an arbitrary reference position.

9. An autonomous working method using an autonomous working system comprising a master working robot and at least one slave working robot, the autonomous working method comprising:
    receiving information regarding space targeted for working;
    setting a movement path of the master working robot, a sensing position, and a sensing angle at the sensing position;

determining a position of the master working robot by comparing sensing data obtained at the sensing position with reference map data, and determining a position of the at least one slave working robot wherein the autonomous working method further comprises:

displaying, by the master working robot, task information on the space targeted for working; and recognizing the task information and performing a task corresponding to the recognition result, by the at least one slave working robot, and wherein a position at which the task information is displayed exists on the movement path of the master working robot.

10. The autonomous working method of claim 9, wherein the determining a position of the at least one slave working robot comprises:

receiving information on the position of the master working robot; and calculating the received position and a distance and angle between the slave working robot and the master working robot.

11. The autonomous working method of claim 9, wherein in the determining the position of the at least one slave working robot, a position signal output from a transceiver provided at an arbitrary position is received, and the position of the at least one slave working robot is determined from the position signal.

12. The autonomous working method of claim 9, wherein the task information further comprises position information corresponding to the position at which the task information is displayed, and in the determining of the position of the at least one slave working robot, the position of the at least one slave working robot is determined by using the position information.

13. A computer-readable recording medium having recorded thereon a program for performing the autonomous working method of claim 9.

* * * * *